(12) United States Patent
Vlcek et al.

(10) Patent No.: US 6,452,698 B1
(45) Date of Patent: Sep. 17, 2002

(54) TRANSPARENT AND SEMITRANSPARENT DIFFRACTIVE ELEMENTS, PARTICULARLY HOLOGRAMS AND THEIR MAKING PROCESS

(75) Inventors: Miroslav Vlcek, Pardubice (CZ); Ales Sklenar, Hradec Králové (CZ)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 09/646,263

(22) PCT Filed: Mar. 11, 1999

(86) PCT No.: PCT/CZ99/00007
§ 371 (c)(1),
(2), (4) Date: Nov. 27, 2000

(87) PCT Pub. No.: WO99/47983
PCT Pub. Date: Sep. 23, 1999

(30) Foreign Application Priority Data

Mar. 13, 1998 (CZ) ................................ 760-98

(51) Int. Cl.⁷ ............................ G03H 1/02; G02B 5/18
(52) U.S. Cl. ............................ 359/3; 359/569; 359/576
(58) Field of Search ............................ 359/2, 3, 569, 359/576, 1, 566; 365/124, 125; 369/275.1, 275.2, 275.3, 275.4, 275.5

(56) References Cited

U.S. PATENT DOCUMENTS

| 3,703,407 A | 11/1972 | Hannan et al. ............... 359/3 |
| 3,825,317 A | 7/1974 | Inoue et al. .................... 359/6 |
| 4,856,857 A | 8/1989 | Takeuchi et al. ............... 359/3 |
| 5,138,604 A * | 8/1992 | Umeda et al. ................. 283/86 |
| 5,465,238 A * | 11/1995 | Russell ......................... 359/20 |
| 5,496,072 A | 3/1996 | Yamauchi et al. ............ 283/86 |
| 5,745,475 A * | 4/1998 | Ohno et al. ............... 369/275.4 |
| 6,036,807 A * | 3/2000 | Brongers ....................... 359/2 |

FOREIGN PATENT DOCUMENTS

GB 1404837 * 9/1975

* cited by examiner

Primary Examiner—Cassandra Spyrou
Assistant Examiner—John Juba, Jr.
(74) Attorney, Agent, or Firm—Hoffmann & Baron, LLP

(57) ABSTRACT

Transparent and semitransparent diffractive elements, particularly holograms with a diffractive pattern created at least in one of two following layers with different index of refraction: a transparent bearing layer (1) from polymer or copolymer having index of refraction n<1.7, and a holographic effect-enhancing, high refraction index layer (2) formed by chalcogenide based substances comprising at least one element from the group sulphur selenium, tellurium, said layer (2) has n>1.7 and its melting temperature is lower than 900° C. The diffractive element can further contain a protective layer (6) and/or an adhesive layer (7) and/or a fragile layer (8) and/or an anchoring layer (9). The diffractive pattern is either formed in said bearing layer (1) and subsequently a high refraction index layer (2) (comprising one or more layers chalcogenide based substances of different composition, which can be deposited subsequently or simultaneously) is deposited on the said layer (1), or said layer (2) is firstly deposited onto said layer (1) and diffractive pattern is mechanically formed into this system.

10 Claims, 7 Drawing Sheets

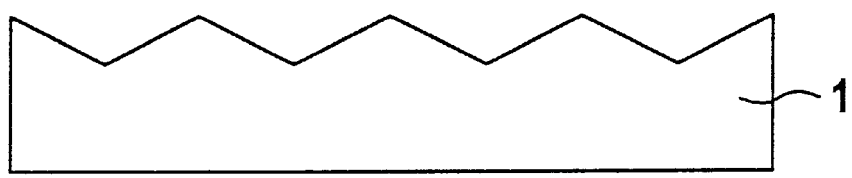
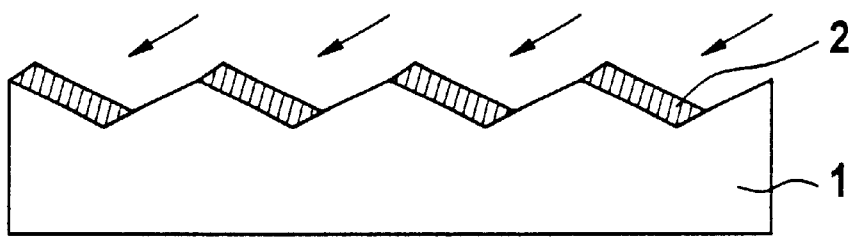
Fig. 3
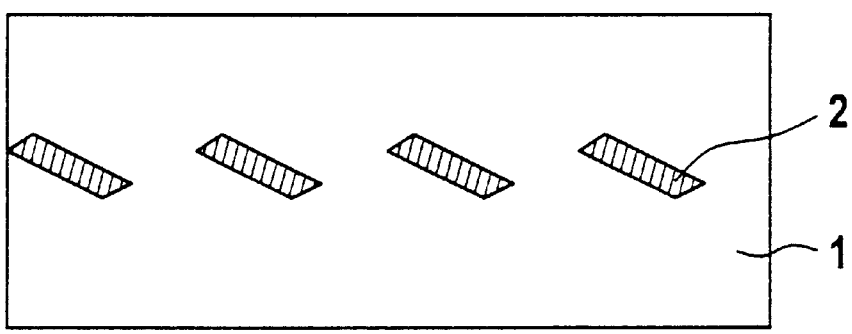

1 - $Ge_{20}Bi_{10}S_{70}$, 15 nm
2 - $Ge_{30}Sb_{10}S_{60}$, 10 nm
3 - $Ge_{15}Sb_{25}Se_{60}$, 10 nm
4 - $As_2Se_3$, 10 nm
5 - $Ge_{30}Sb_{10}S_{60}$, 20 nm
6 - $Ag_8As_{36,9}Se_{55,1}$, 20 nm
7 - $Cu_{35}Te_{30}Se_{35}$, 15 nm

1 - $Ge_{30} Sb_{10} S_{60}$, 30 nm
2 - $Ge_{30} Sb_{10} S_{60}$, 20 nm
3 - $Ag_8 As_{36,9} Se_{55,1}$, 15 nm
4 - $Ge_{20} Bi_{10} S_{70}$, 15 nm

TRANSPARENT AND SEMITRANSPARENT DIFFRACTIVE ELEMENTS, PARTICULARLY HOLOGRAMS AND THEIR MAKING PROCESS

BACKGROUND OF THE INVENTION

This invention relates to a improvement and semitransparent diffractive elements and more particularly to a transparent and semitransparent type holograms and their making process. These diffractive elements are themselves transparent or semitransparent in visible (VIS) and/or near infrared (NIR) spectral region and yet are also endowed with the characteristics of a reflection type elements being observed under suitable angle. It means that reproduction in the transparent or semitransparent element of the present invention is effected only within specific reproduction angle range, while no hologram is recognised at other ordinary angles. This leads to the advantage that there is no visual obstruction of the article on which the diffractive element is laminated. FIG. 1 shows the basic constitution of the transparent or semitransparent diffractive element according to the present invention.

STATE OF THE ART

Demand for holograms has grown not only as the way of the record of sound or information but as the elements used in such activities of human beings as advertisement, security sector, safety technique, protection of product originality, money counterfeit protection etc. It is well known that one of the following replication technologies is usually used for mass production of any diffractive elements in suitable polymer materials—hot embossing, injection moulding and casting.

Relief microstructure (master copy) is produced by one of the many high resolution fabrication technologies, the most commonly used being holographic exposure of suitable photosensitive material, including chalcogenides (U.S. Pat. No. 3,825,317), direct writing with focused laser and e-beam, optical photolithography with subsequent wet or dry etching.

In most cases, a nickel shim or stamper is electroformed or replica is produced through casting into epoxy resin. These replicas are used for own mass production of copies into polymers using injection moulding (CD fabrication), casting (production of gratings for spectrophotometers) or hot embossing, for example into transparent foil (M. T. Gale: J. of Imaging Science and Technology 41 (3) (1997) 211).

Transparent polymeric materials such as polyethylene with index of refraction n=1.5–1.54, polypropylene n=1.49, polystyrene, 1,6, polyvinyl chloride 1.52–1.55, polyester resin 1.52–1.57 etc. (for more examples see U.S. Pat. No. 4,856,857) or copolymers (for correction of index of refraction) can be used for transparent or semitransparent holograms and other diffractive elements production. Low refraction index value of these polymers or copolymers prepared from them determines their own reflectance (R about 4%), hence the holographic effect of diffractive structure developed in layers of these polymers is insufficient (U.S. Pat. No. 4,856,857). Under the term "holographic effect" used in the following text we will understand the phenomenon, that the hologram is very intensive in reflected light at suitable angle of observation. Low reflected intensity and thus the drawback of poor brightness of diffractive element recorded in the polymer layer is usually passed by forming a thin metallic film (generally Al) on the relief forming face of transparent polymeric layer (M. Miller: Holography—theoretical and experimental fundamentals and their application, SNTL, Prague 1974 (in Czech); M. T. Gale: J. of Imaging Science and Technology 41 (3) (1997) 211).

Strong improvement of brightness achieved at the cost of loss of the transparency is the main drawback of such technique. Transparency or at least semitransparency of diffractive element is required or desired in many applications (for example protective diffractive elements on banknotes, identity cards with photo etc.). Some technical applications of diffractive elements are directly conditioned by transparency or semitransparency of created element (for example microlense array for CCD cameras, polarising filters etc.).

It is further known that to preserve (or to decrease only partly) the transparency of diffractive element and at the same time to improve holographic effect of the hologram recorded in the polymeric layer (further called layer 1), it is necessary to cover layer 1 by other transparent layer (further called layer 2) of different material (further called holographic effect enhancing material) which has in general different index of refraction n (i.e. higher or lower) than material of the transparent layer 1 (U.S. Pat. No. 4,856,857, U.S. Pat. No. 5,700,550, U.S. Pat. No. 5,300,764). The higher difference in index of refraction of polymeric bearing layer 1 and holographic effect-enhancing layer 2, the higher holographic effect can be achieved (U.S. Pat. No. 4,856,857).

It is as well known that very thin layer (with thickness to the limit 20 nm) of suitable metal (e.g. Cr, Te, Ge) can be used as such layer 2 deposited on the transparent 1 in which a hologram has been hot-formed. Such very thin metallic layer being used, relatively high transparency is preserved. Relatively strong enhancing of holographic effect can be achieved when the index of refraction of deposited metallic layer is either significantly lower (e.g. Ag n=0.8; Cu=0.7) or significantly higher (e.g. Cr n=3.3, Mn n=2.5, Te n=4.9) than index of refraction of transparent layer 1 (n about 1.5), (U.S. Pat. No. 4,856,857). Such thin metallic layers are deposited at transparent, diffractive element bearing layer 1 by vacuum deposition technique. The drawback of the application of thin metallic layer as holographic effect enhancing material is relatively high melting point of these materials and therefore difficult evaporating of many of these metals. An additional drawback is high absorption coefficient of metals. Already slight deviations in the thickness of evaporated metal layer implicate significant deviations in the transmissivity of the system (layer 1—bearing diffractive element+layer 2—metal) and moreover upper limit of the permissible thickness is very low (it depends on the metal, but in general it must not exceed 20 nm (U.S. Pat. No. 4,856,857)). According to our measurements evaporation of either 10 nm thick Cr layer or 4 nm thick Ge layer on the polymeric layer decreases its transmissivity down to about 30% (see FIG. 2).

In the present art, oxides of metals (e.g. ZnO, PbO, $Fe_2O_3$, $La_2O_3$, MgO etc.) halogenide materials (e.g. TlCl, CuBr, $ClF_3$, $ThF_4$ etc.) eventually more complex dielectric materials (e.g. $KTa_{0.65}NB_{0.35}O_3$, $Bi_4(GeO_4)_3$, $RbH_2AsO_4$ etc.) are used single or possibly in several layers deposited criss-cross as holographic effect enhancing layers (U.S. Pat. No. 4,856,857). The drawback of the application of these materials is the fact that their index of refraction values are very close to the index of refraction of transparent polymeric layer 1 (e.g. index of refraction values are 1.5 for $ThF_4$, 1.5 for $SiO_2$, 1.6 for $Al_2O_3$, 1.6 for $RhH_2AsO_4$ etc.) (U.S. Pat. No. 486,857). Accordingly, an amplification of holographic effect is relatively low. Many of these materials require again relatively high temperature for their evaporation and not least some of them are quite expensive or hardly preparable, what obstructs their mass application.

Further it is known, that binary chalcogenides of zinc and calcium as well as compounds $Sb_2S_3$ and PbTe (U.S. Pat. No. 4,856,857), eventually multilayer systems of these chalcogenides with oxides or halides (U.S. Pat. No. 5,700,550) or multilayer system ZnS and $Na_3AlF_6$ (U.S. Pat. No. 5,300,784) can be used as holographic effect enhancing. These materials are endowed with satisfactory index of refraction values (e.g. 3.0 for $Sb_2S_3$, 2.6 for ZnSe, 2.1 for ZnS). But short wavelength absorption edge of many of these materials (e.g. $Sb_2S_3$, CdSe, CdTe, ZnTe) lies within near IR region only and these materials are characterised by high values of absorption coefficient in VIS. Similarly with metal layer used as layer 2, only very thin layers of these materials can be used as holographic effect enhancing layer 2 to achieve at least semitransparency of final product. Transparency is again significantly influenced by thickness deviations. Additional significant drawback of these materials is their difficult vaporization (again similarity with metals) given by their high values of their melting points $T_g$ alfa—ZnS 1700° C., beta—ZnS 1020° C., ZnSe>1100° C., ZnTe 1238° C., CdS 1750° C., CdSe>1350° C., CdTe 1121° C., PbTe 917° C.) Handbook of Chemistry and Physics 64th Edition 1983/84).

In the present art the process according to the scheme given in FIG. 3 is usually used in the mass production of transparent diffractive elements. Firstly a diffractive pattern is made in the layer 1, after it a thin dielectric or metallic layer is evaporated (perpendicularly or under specific incidence angle) a subsequently this evaporated layer is overlapped or laminated by another polymeric layer (M. T. Gale: Journal of Imaging Science and Technology 41 (3) (1997) 211). As above mentioned materials (metals, their oxides, halides, binary chalcogenides of Zn and Cd, $Sb_2S_3$ and PbTe) are used as layer 2 in the production of diffractive elements by this way, the method has the same drawbacks, e.g. high melting temperatures determine difficult deposition, even small deviations in the thickness cause large deviations in the transmissivity, comparable index of refraction of many of these materials with index of refraction of polymeric layer 1, eventually full non transparency in VIS.

Further it is known that holographic tape (relief phase holograms shaped in a vinyl tape) have improved scratch resistance being covered with such materials as waxes, polymers and inorganic compounds, besides others arsenic sulphide can be used (U.S. Pat. No. 3,703,407). In addition the coating enables tapes to be lubricated and enables tapes to be used in a liquid gate tape transport mechanism. In order to maintain the same diffraction efficiency as an uncoated tape, the minimum depth of this coating must be greater than the maximum peak-to-valley depth of any corrugation (U.S. Pat. No. 3,703,407).

SUBJECT MATTER OF THE INVENTION

The present invention does away with the drawbacks of the present-day techniques of transparent and semitransparent diffractive elements production.

Transparent and semitransparent diffractive elements, particularly holograms, consisting at least of two layers with a different index of refraction, whereof a first bearing layer (1) is a transparent polymer or copolymer having index of refraction lower than 1.7 and on said first bearing layer is deposited a second to exposure sensitive holographic effect enhancing high refraction index layer (2) constituted by substances based on chalcogenides with an index of refraction higher than 1.7 and a melting temperature lower than 900° C., characterized in that the first diffractive pattern is mechanically shaped in the bearing layer (1) and/or in the the high refraction index layer (2) and at least one further second diffractive pattern is formed in the high refraction index layer (2), constituted by substances based on chalcogenides comprising at least one of the elements from the group sulphur, selenium, tellurium, the said chalcogenide based substances being selected from the group of binary, ternary and even more complex chalcogenide and/or chalcohalogenide systems, containing, in addition to S or Se or Te, as a more electropositive element some of the elements Cu, Ag, Au, Hg, B, Al, Ga, In, Tl, Si, Ge, Sn, Pb, N, P, As, Sb, Bi.

Chalcogenides based matters can contain further transient metal and/or at least one rare earth element, e.g. Pr, Eu, Dy.

Transparent or semitransparent diffractive element can further consists of other layers e.g. protective layer, adhesive layer, fragile layer, anchor layer. Protective layer protects layer 2 or layer 1 against environmental effect or against undesirable effect of consecutive exposure by UV light and improves resistivity of the final product. The layer can either be permanent part of the hologram or of the diffractive element or can be removable. Adhesive layer allows unrepeatable or repeatable anchoring of the hologram or other diffractive element on protected article, printed document etc. The function of fragile layer is to adhere the upper layer and the lower layer and yet effect destruction of diffractive element during peeling for the purpose of forgery. Anchor layer is used to improve adhesivity of diffractive element to the base supporting sheet or to releasable sheet in the case of application as seal, sticker, label etc.

Transparent layer 1 can be inseparable part of some larger product, in such case the high refraction index layer 2 can be for example sprayed on the layer 1.

Procedure of transparent diffractive elements production consists of the formation of the first diffractive pattern in a bearing layer 1 and subsequent deposition of high refraction index layer 2, which is formed with a chalcogenide based matters of different compositions. The deposition of different chalcogenide based matters can be consecutive or simultaneous and then the second diffractive patterns are formed in the said exposure-sensitive high refraction index layer 2.

Alternative way of transparent and semitransparent diffractive elements production is firstly to deposit high refraction index layer 2 on bearing layer 1 and only after that to originate a required the first diffractive pattern into high refraction index layers at elevated temperature for example using hot embossing technique. If the depth of diffractive pattern is greater than the thickness of high refraction index layer 2 (very common situation), practically identical product (FIG. 1) is obtained as when the previous procedure is used. If the embossing depths are lower than thickness of high refraction index layer, the layer 1 operates as carrier of high refraction index layer 2 only. After that the second diffractive patterns are formed in the said to exposure sensitive high refraction index layer 2.

High refraction index layer can be deposited on a previously coloured layer 1 and thus through the combustion of their colours (colour of layer 2 depending on the composition and thickness used) a required colour effect of transparent or semitransparent diffractive element can be achieved.

High refraction index layer 2 can be deposited either at low pressure e.g. using vacuum evaporation, sputtering or chemical vapour deposition (CVD) technique or at normal pressure as solution of chalcogenide based matters using e.g. spraying, painting or spin coating method.

The composition of high refraction index layer 2 formed with some chalcogenide based matters can be modified by exposure or annealing induced diffusion of metals and/or by halogens and/or oxygen, which are implanted into layer 2 by interaction of the layer 2 with halogen vapours or oxygen or by air hydrolysis.

The sensation of the first diffractive pattern shaped mechanically in layer 1 and/or layer 2 is modified by second diffractive pattern formed in layer 2 by exposure and/or annealing and/or by selective etching.

Exposure with radiation of suitable wavelength and intensity (values depend on the particular composition of high refraction index layer (2), e-beam, ions, X-ray radiation etc.) or annealing originates structural changes in high refraction index layer or it originates even changes in its chemical composition (e.g. diffusion of metal, which is in direct contact with high refraction index layer, hydrolysis, oxidation). Thereby a change of the value of index of refraction of layer 2 takes place (it usually increases) and thus the difference between values of index of refraction of bearing layer 1 and high refraction index layer 2 is modified. It results in a different optical perception of the product. A chemical reaction induced by exposure or by annealing, e.g. with surrounding atmosphere, can result in the transformation of chalcogenide material into fully different compound (e.g. oxide), the product of such reaction must again satisfy the condition, that its index of refraction is higher than 1.7.

Local exposure through the mask or holographic exposure or local annealing can produce a record of the further second diffractive pattern into the high refraction index layer 2; the record can be either amplitude (based on different absorption coefficient of exposed and unexposed part of layer 2) or phase type based on either different values of index of refraction of exposed and unexposed parts of layer 2 or based on different thickness of exposed and unexposed parts of the layer 2 (different thickness can be achieved not only directly during exposure but also by consecutive etching of layer 2 by using well-known methods); even here can be used the phenomenon of local photoinduced diffusion, hydrolysis, oxidation etc. and the matter of high refraction index layer 2 can, in the place of local exposure or annealing change its chemical composition; resulting record in the high refraction index layer 2 can partly modify visual perception of the hologram and in addition it can be seen in view-through.

As index of refraction values of majority of chalcogenides exceed the value n=2, application of chalcogenides layers as holographic effect enhancing layer 2 deposited on the transparent polymeric layers 1 with n<1.7 results generally in a significant visual perception. The transparency of final hologram or other diffractive element can be influenced through the thickness of layer 2.

Another important advantage of chalcogenide materials is the fact, that they can be synthesised in many systems in amorphous state and their glass forming regions are relatively wide. Being amorphous, these materials have not only very low scattering losses, but the possibility to prepare even nonstochiometric compounds takes place. Gradual mutual substitution of elements (not only S, Se and Te) in the composition of amorphous chalcogenides causes continuous changes in their index of refraction and reflectivity. Thus enhancement of holographic effect can be "tailored".

As a result of gradual mutual substitution of elements in the composition of amorphous chalcogenides arises gradual changes of their optical gap $E_g^{opt}$ values (e.g. $As_{40}S_{60}$ Ehd $g^{opt}$=2.37 eV, $As_{40}S_{40}Se_{20}$ 2.07 eV, $As_{40}Se_{60}$ 1.8 eV) followed by gradual changes in the position of short wavelength absorption edge. Thus the colour (for given thickness) of layer 2 can be changed as well and transparent and semitransparent systems of different colours endowed with high holographic effect can be produced. So even colourless polymeric layers 1 can be used for production of transparent or semitransparent diffractive elements of required colour using one (or more) chalcogenide based layer of suitable composition as a layer 2. Thus composition and thickness of chalcogenide layer 2 influence significantly the transparency of final product (hologram) (FIG. 4) and reflectivity (FIG. 5) and thus intensity of holographic perception (it increases with the reflectivity of layer 2).

Amorphous chalcogenides are mainly as thin layers photosensitive to exposure with radiation of suitable intensity and wavelength (given by composition of the layer), e-beam, ions etc. This property enables us to provide a supplementary correction of index of refraction, reflectivity and transmissivity of high refraction index thin layer using exposure induced structural changes (FIG. 6), by exposure induced reaction of photosensitive chalcogenide layer with metal (e.g. Ag) (FIG. 6) or with gas ($O_2$, air humidity) induced transformation into different chemical substance, which must satisfy the condition that n>1.7. Similar effects can be achieved by annealing.

If exposure or annealing are local only, procedures mentioned in the previous paragraph can result in the formation of an image (including holographic one) in the high refraction index layer, which can partly modify visual perception of the hologram and in addition it can be seen in viewthrough. Sectional views of structures developed using photoinduced structural changes and photoinduced metal diffusion are presented in FIGS. 7 and 8.

Further advantage of above mentioned chalcogenides are their low melting temperatures (usually 100–300° C.). They can be therefore deposited by worldwide commonly used vacuum evaporation method. As the values of absorption coefficient in the region behind short wavelength absorption edge are low, even possible small deviation in the thickness influences much less the holographic effect enhancing than when thin metallic layers are used. Large areas of chalcogenide layers can be formed relatively easily using corresponding vacuum evaporation equipment. The thickness of the chalcogenide layer 2 can be adjusted by synchronising the evaporation rate with the feed speed of transparent bearing layer 1.

Further advantage of amorphous chalcogenides is the fact, that mass production of chalcogenides of many compositions exist worldwide and they are thus immediately commercially available at affordable price.

EXAMPLES OF DESIGN

Figure 1:
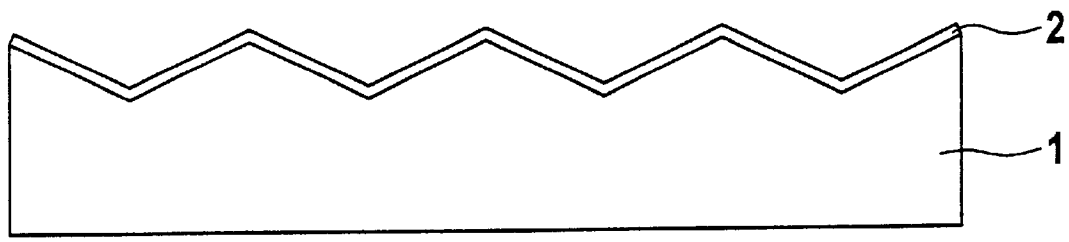
FIG. 1 Sectional view of the diffractive element of the present invention, 1—transparent bearing polymeric layer with $n_1$<1.7, 2—high refraction index chalcogenide based layer with n2>1.7
Figure 2:
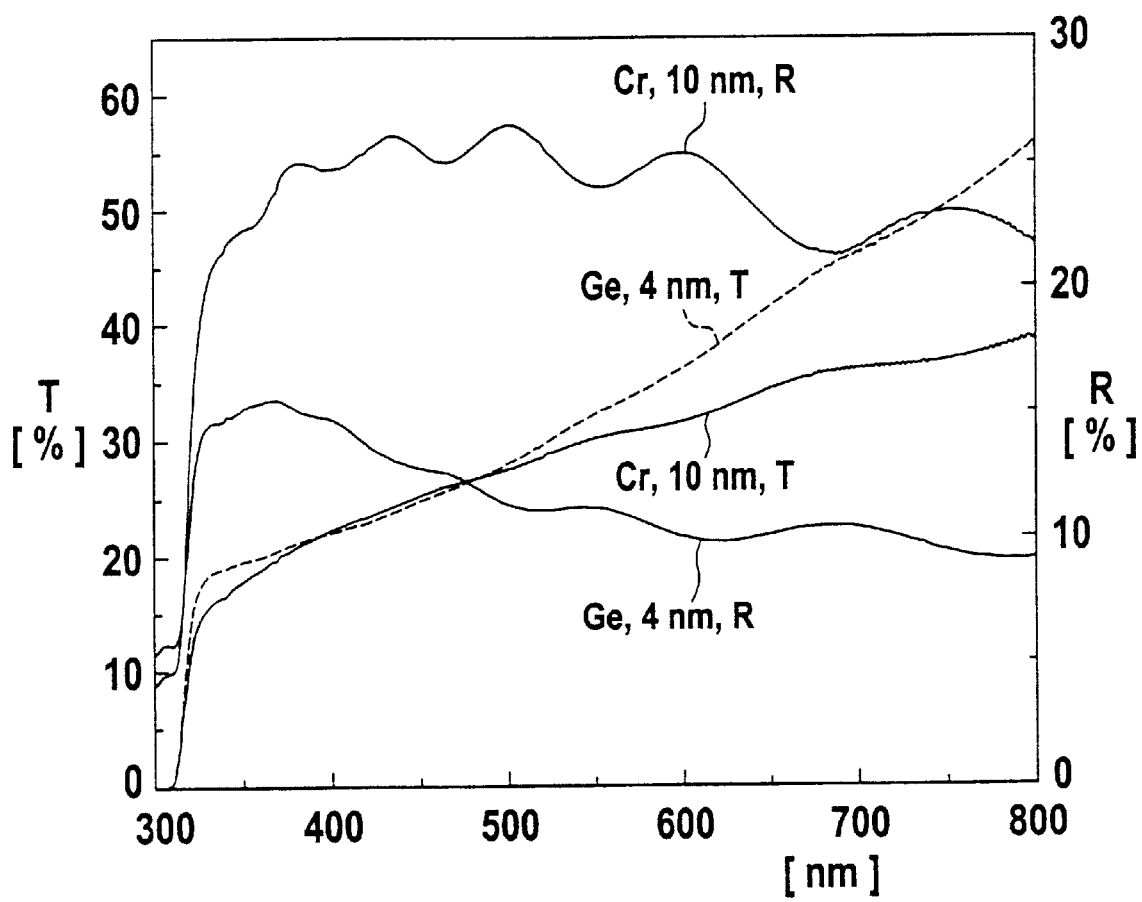
FIG. 2 Optical transmissivity T and reflectivity R of holograms produced by deposition of thin high diffractive index layer 2 formed by Cr or Ge on polyethylene layer 1 with hot embossed diffractive pattern FIG. 3 Sectional views of sequence creation of transparent diffractive element based on the possibility of creation a diffractive pattern in bearing layer 1 and exploiting of the difference in index of refraction of layers number 1 and 2.

Following examples are given for better understanding of the present invention. Transparent polyethyleneterephthalate foil (n=1.58) with thickness 50 μm or polycarbonate foil (n=1.59) with thickness 60 μm were employed as layer 1 satisfying condition n<1.7. Diffractive patterns were stamped into these layers using Ni shim and hot embossing method. Holograms and other diffractive elements, which were characterized by very low holographic effect, were further treated by some of the following processes given in examples 1 to 6. Application of thin chalcogenide layer as holographic effect enhancing, high refraction index layer 2 (FIG. 1) is the common vein in all these examples. The possibility to modify hologram or another diffractive element prepared by technique given in example 1 using well known phenomenon of photoinduced changes of the structure and properties of chalcogenides used as high refraction index layer 2 is demonstrated in examples 2–4. Example 7 is demonstration of relief pattern production by stamping or pressing the pattern into system polymeric layer 1—chalcogenide high refraction index layer 2 created in advance. All methods of fabrication of holograms or other diffractive elements fabrication given in Examples 1–7 can be used for production of more complicated final products, sectional view of one of them is given in FIG. 9. Example of one simpler application of transparent holograms of the present invention is given in the Example 8.

EXAMPLE 1

Figure 4:
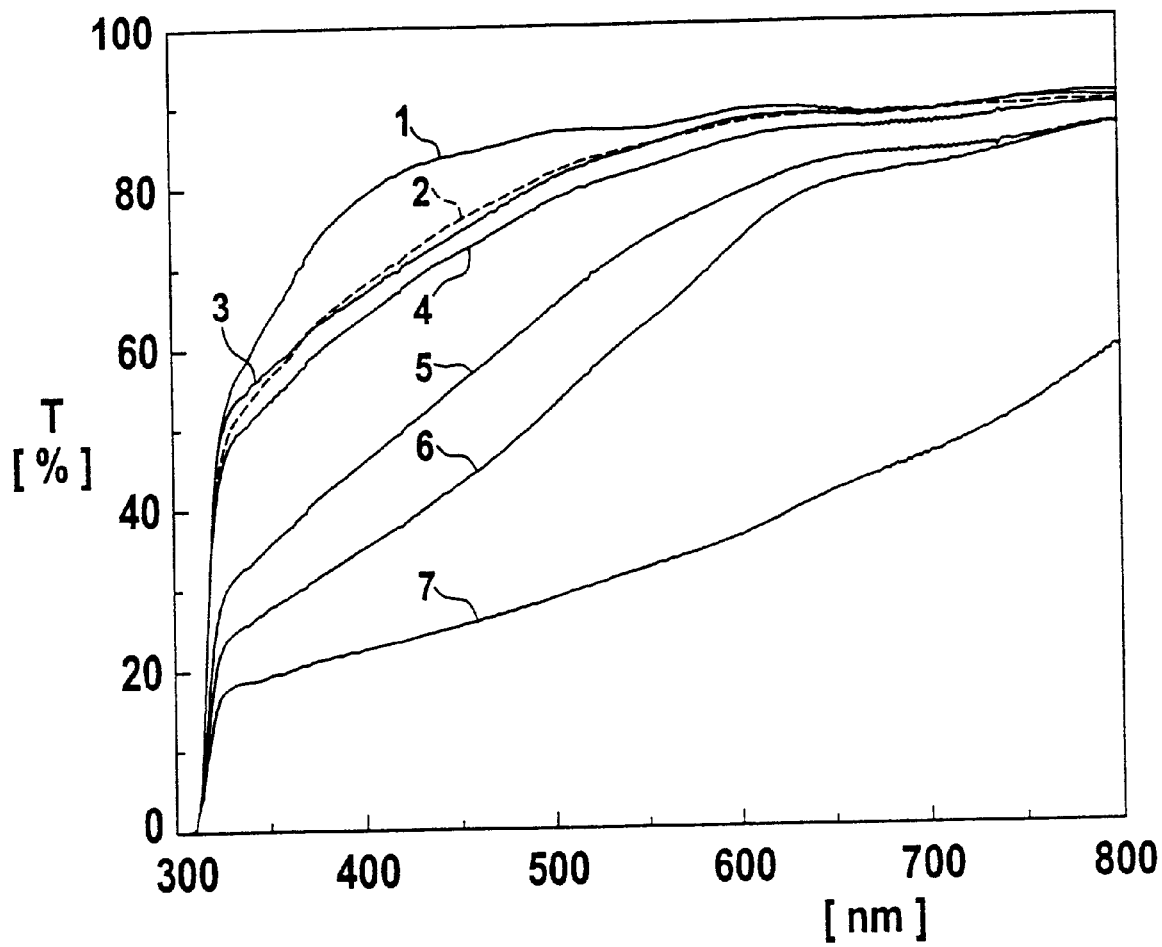
FIG. 4 Optical transmissivity of holograms produced by deposition of thin high diffractive index layer 2 formed by selected chalcogenide materials on polyethylene layer 1 with hot embossed diffractive pattern FIG. 5 Reflectivity of holograms produced by deposition of thin high diffractive index layer 2 formed by selected chalcogenide materials on polyethylene layer 1 with hot embossed diffractive pattern FIG. 6 Changes in optical transmissivity T of holograms created by photoexposure and by diffusion of Ag according to the techniques described in example 2 and 3.
Figure 5:
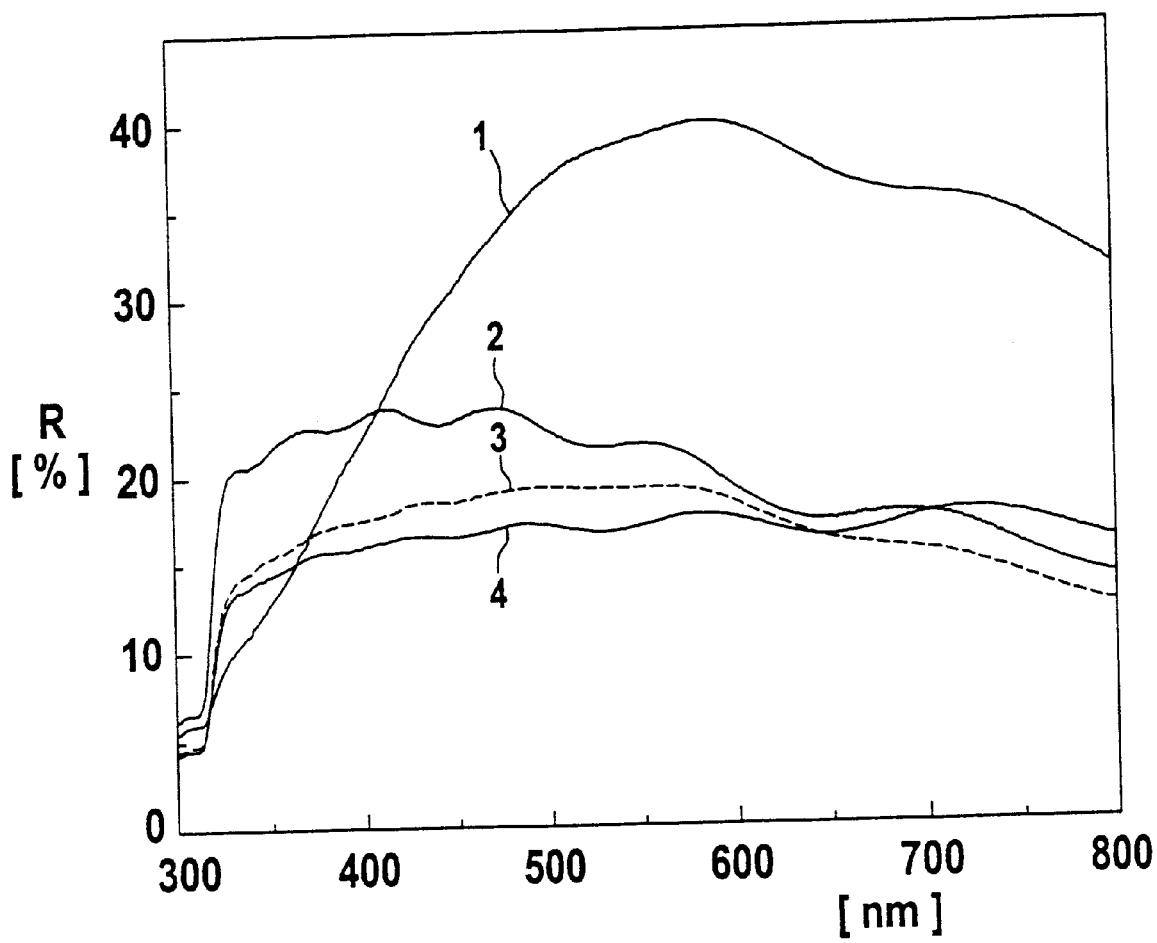
Figure 6:
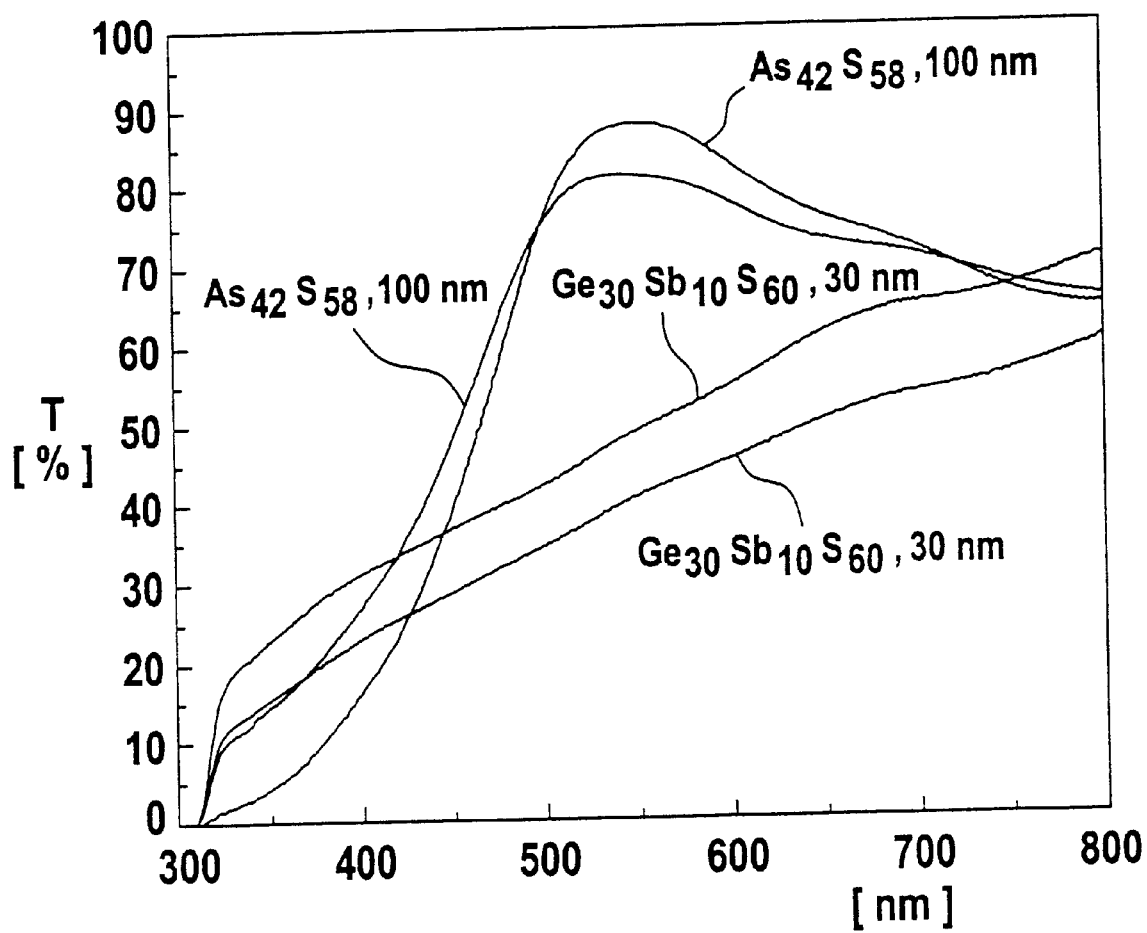

Thin layers (d=10–500 nm) of $Ge_{30}Sb_{10}S_{60}$ composition (n=2.25) were deposited by vacuum evaporation method (deposition rate 1 nm/sec, pressure $5.10^{-4}$ Pa) on bearing layer 1 from the side of relief pattern fabricated beforehand in layer 1. In all cases sufficient holographic effect has been achieved as a result of a greater reflected light intensity. Relatively high transparency of prepared system has been preserved. Reflectivity (FIG. 5 curves 1,2) and transmissivity (FIG. 4 curves 2, 5 and FIG. 6 curve for d=30 nm) of obtained structures depend on the thickness of deposited high refraction index layer 2. Thicker layers (of the order hundreds nanometers) being used, spectral dependence of the optical transmissivity and reflectivity was influenced strongly by interference phenomena, as vawelength of VIS and NIR radiation is comparable with thickness of high refraction index layer 2.

Similar results were obtained when other chalcogenide materials, e.g. $Ge_{20}Sb_{25}Se_{55}$ (n=3.11), $As_{50}Ge_{20}Se_{30}$ (n=2.95), $(As_{0.33}S_{0.67})_{90}Te_{10}$ (n=2.3) were applied as layer 2. Results of application of further chalcogenide based systems $Ag_8As_{36.9}Se_{55.1}$, $Ge_{20}Sb_{10}S_{70}$. $As_{40}S_4Se_{20}$, $As_{20}Se_{40}Te_{40}$ as layers 2 satisfying condition n>1.7 are given in FIGS. 4–6. Similar results were achieved when other binary (e.g. $Se_{90}Te_{10}$, $Ge_{33}S_{67}$), ternary (e.g. $(As_{0.33}S_{0.67})_{95}|_5$) or even more complicated (e.g. $As_{40}S_{40}Se_{10}Ge_{10}$) chalcogenides were applied as layer 2. Thin layers of more complicated systems can be prepared either by vacuum evaporation of bulk samples of the same composition or by simultaneous evaporation of more simple chalcogenides from two boats (e.g. $As_{40}S_{60}$, $Ge_{33}S_{67}$, $As_{40}Se_{60}$ etc.). Enhancement of holographic effect has been achieved as well when chalcogenide layers were deposited sequentially, e.g. two different holographic effect enhancing layers were deposited sequentially. Thin layers of some chalcogenides (mainly of sulphides, e.g. $Ge_{33}S_{67}$) are relatively unstable in the air and can be hydrolysed, thus oxygen can be built in their structure. Even thus hydrolysed layers operate as holographic effect enhancing layers

EXAMPLE 2

Figure 7:
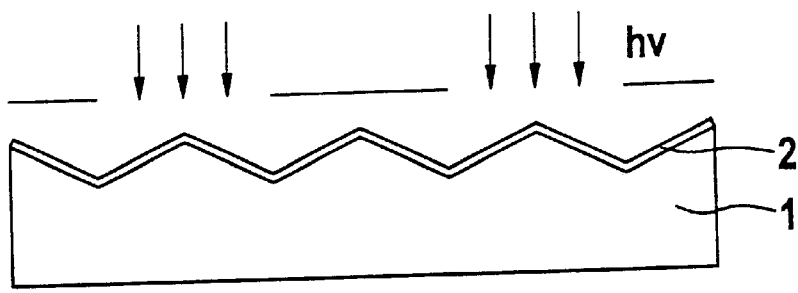
FIG. 7 Sectional views of sequential steps of creation of transparent hologram or other diffractive element based on the possibility of creation of a diffractive pattern in bearing layer 1, exploiting the difference in index of refraction of layers number 1 and 2 and the photosensitivy of high refraction index chalcogenide layer 2.
Figure 7:
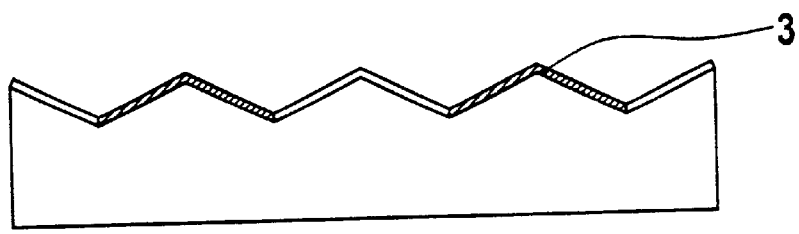

Thin layer $As_{42}S_{58}$ with thickness 100 nm was deposited by technique presented in example 1 on the carrying layer 1. Thus a significant holographic enhancing effect was achieved and the hologram recorded in carrying layer 1 was clearly visible under suitable angle of observation. The system prepared by this way was modified using above described phenomenon of photoinduced structural change in high refraction index layer 2 (where exposed, the layer is transformed into a state marked as number 3 in FIG. 7). Exposition of the system from the index of refraction layer 2 side by UV lamp (I=18 mW/cm$^2$) for 300 sec caused a changed optical transmissivity of the system (FIG. 6) accompanied with increase of index of refraction value for about 0.1 and thus holographic effect was enhanced as well. Local exposure through the mask caused only local changes in the transmissivity and index of refraction (layer 3 in FIG. 7) and thus a negative picture (exposed parts are less transparent) of used mask was developed in $As_{42}S_{58}$ layer, which can be seen in view-through and modifies the optical perception of the hologram recorded in the layer 1 when this is observed in reflection. Similar results were achieved when after deposition of $As_{42}S_{58}$ layer, still before its exposure, the system layer 1—layer 2 was treated in iodine vapours, what transformed composition of layer 2 into As—S—I (real composition depends on the temperature and concentration of $I_2$). Even without subsequent exposure chalcogenide As—S—I layer had an enhanced holographic effect.

EXAMPLE 3

Figure 8:
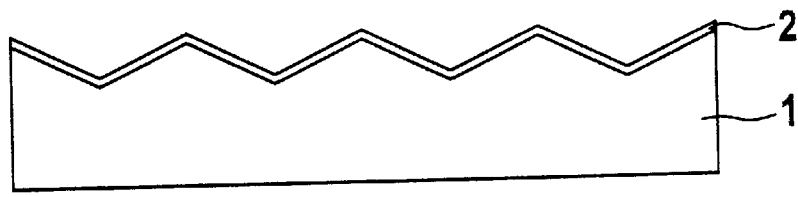
FIG. 8. Sectional views of sequential steps of creation of transparent hologram or other diffractive element based on the possibility of creation a diffractive pattern in bearing layer 1, exploiting the different in the index of refraction of layers number 1 to 2 and 5 ($n_1$, $n_2$ $n_5$) and the photoinduced diffusion of metal 4 into chalcogenide layer 2 leading to origin metal doped high refraction index chalcogenide layer 5.
Figure 8:
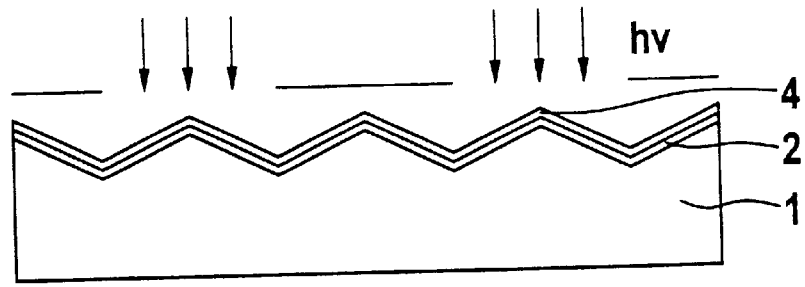
Figure 8:
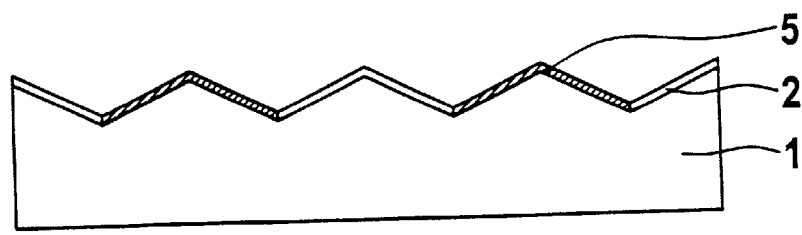

Thin $Ge_{30}Sb_{10}S_{60}$ layer with thickness 30 nm and subsequently 10 nm thin Ag layer (layer 4 in FIG. 8) were deposited by technique presented in example 1 on carrying layer 1. Consecutive 300 sec exposure with Xe lamp (I=20 mW/cm$^2$) induced diffusion of Ag into Ge$_{30}$Sb$_{10}$S$_{60}$ layer, which was local only when exposition was provided through the mask (new composition layer Ag—Ge$_{30}$Sb$_{10}$S$_{60}$, marked as layer 5 in FIG. 8). New Ag—Ge$_{30}$Sb$_{10}$S$_{60}$ layer has generally a higher value of index of refraction than Ge$_{30}$Sb$_{10}$S$_{60}$ layer, final value depending on the amount of diffused silver. Excessive, unreacted Ag was striped by dipping in diluted HNO$_3$ (1:1) and thus the picture of the mask was recorded into original layer 2. This picture can be seen in view-through and modifies optical perception of the hologram recorded in the layer 1 when this is observed in reflection.

EXAMPLE 4

Final product fabricated in example 3 was further immersed in 0.02 mol/l KOH solvent, in which only high refraction index layer 2 is partly soluble. Layer 5 is resistant against this solvent. Thus a relief picture is formed in chalcogenide layer which can be seen in view-through and which again modifies optical perception of the hologram recorded in the layer 1 when this is observed in reflection.

EXAMPLE 5

Thin layer (d=40 nm) of Ge$_{24.6}$Ga$_{10.2}$S$_{64.8}$Pr$_{0.35}$ was deposited by vacuum evaporation method (deposition rate 1 nm/sec, pressure $5.10^{-4}$ Pa) on the bearing layer 1 from the side of relief pattern fabricated beforehand in layer 1. Application of these materials as a high refraction index layer resulted again in the enhancement of the holographic effect, e.g. hologram recorded in carrying layer 1 was well seen when observed under specific angle.

EXAMPLE 6

Thin As$_{40}$S$_{60}$ layer was deposited using spin coating method at normal pressure on the polycarbonate bearing layer 1 from the side of relief pattern fabricated beforehand in layer 1. Starting solution As$_{40}$S$_{60}$ in n-propylamine was used in concentration 0.8 mol/l. Thicknesses of prepared layers were in range 0.5–2 μm. Deposition of As$_{40}$S$_{60}$ layer again led to partial improvement of optical perception of the hologram recorded in the layer 1 when this was observed in reflection.

Similar results were achieved when solutions of As$_{33}$S$_{67}$ or As$_{40}$S$_{60}$ in n-propylamine or triethylamine were used either for spin coating deposition or these solvents were only painted on bearing layer 1.

EXAMPLE 7

Thin As$_{35}$S$_{65}$ layer (d=30 nm) was deposited by vacuum evaporation method on polycarbonate bearing layer 1. Relief structure was stamped into this bilayer from the side of high refraction index layer 2 by hot embossing at temperature about 150° C. After a couple of minutes at this temperature, the whole system was cooled down and only after that thrust released. The product had similar properties as when As$_{35}$S$_{65}$ layer of identical thickness was used to prepare hologram by the technique described in Example 1. An identical result was achieved when As$_{35}$S$_{65}$ layer was deposited on layer 1 by CVD method.

EXAMPLE 8

Thin layers (d=20 nm) of Ge$_{30}$Sb$_{10}$S$_{60}$ composition (n=2.25) was deposited by vacuum evaporation method (deposition rate 1 nm/sec, pressure $5.10^{-4}$ Pa) on bearing layer 1 from the side of relief pattern beforehand fabricated in layer 1. Obtained hologram was set on document with test and photo (which had to be protected by applicated transparent hologram) and sealed with the document into 175 μm thick polyester foil provided with fusible paste. With regard to high transparency of the hologram (45%–85% in spectral region 400–750 nm, see FIG. 4 curve 5) were both, text and photo, very well readable and at the same time with regard to high reflection (24–15%, FIG. 5 curve 2) the hologram formed in the bearing layer 1 was very well seen being observed under specific angle.

Similar results (with different level of transparency and holographic effectiveness depending on the composition and thickness of layer 2) were obtained when other holograms endowed with enhanced holographic effect caused by application of chalcogenide thin layer 2 prepared by methods presented in examples 1–7 were used as counterfeit protecting elements.

Figure 9:
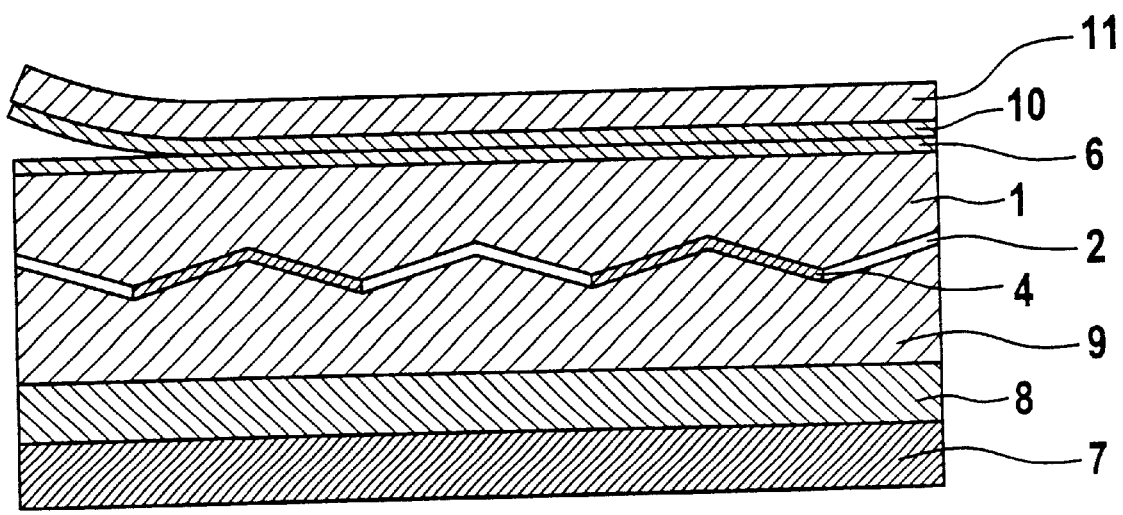
FIG. 9. Sectional view of possible final product—transparent hologram transfer sheet, which once being stuck on the protected article can not be peeled off without its destruction.

Example of one diffractive structure which can be prepared according to the present invention is given in FIG. 3 (including processing and an example of one possible multilayer hologram is presented in FIG. 9, where 6 stands for protecting layer which protects a high refraction index layer 2 or bearing layer 1 against environmental effect or against undesirable effect of consecutive exposure by UV light and improves resistivity of the final product, 7 stands for adhesive layer which enables either unrepeatable or repeatable anchoring of the hologram or other diffractive element on the protected article, 8 stands for fragile layer which ensures good adherence of two layers to each other and which depreciates itself during any attempt to peel off and thus causes irreversible deformation and destruction of the diffractive element, 9 stands for the anchor layer, which is usually used to improve adherence of adhesive layer 7 to high refractive index layer 2 or to the bearing layer 1, 10 stands for adhesive layer providing clutching of hologram to the carrier 11 before its own application.

INDUSTRIAL APPLICATION the present invention is applicable for fabrication of transparent and semitransparent diffractive elements and more particularly to a transparent and semitransparent type holograms. Besides of technical applications (e.g. record of picture or information) these products can be used in such activities of human beings as advertisement, security sector, safety technique, protection of product originality, money counterfeit protection etc.

What is claimed is:

1. Diffractive elements consisting at least of two layers with a different index of refraction, whereof a first bearing layer is a transparent polymer or copolymer having index of refraction lower than 1.7 and on said first bearing layer is deposited a second holographic effect enhancing, exposure-sensitive, high refraction index layer constituted by substances based on chalcogenides with an index of refraction higher than 1.7 and a melting temperature lower than 900° C., characterized in that a first diffractive pattern is mechanically shaped in at least one of the bearing layer and the high refraction index layer and at least one second diffractive pattern is formed in the exposure-sensitive, high refraction index layer, constituted by substances based on chalcogenides comprising at least one of the elements from the group sulphur, selenium, tellurium, the said chalcogenide based substances being selected from the group of binary, ternary and even more complex chalcogenide systems and/or ternary chalcogenide systems, containing, in addition to S or Se or Te, as a more electropositive element some of the elements Cu, Ag, Au, Hg, B, Al, Ga, In, Tl, Si Ge, Sn, Pb, N, P. As, Sb, Bi.

2. The diffractive elements according to claim 1, characterized in that the chalcogenide based substances further comprise a transient metal.

3. The diffractive elements according to claim 1 characterized in that it further comprises a protecting layer, an adhesive layer, a fragile layer or an anchoring layer or a combination thereof.

4. The diffractive elements according to claim 1 in which the first diffractive pattern is shaped in the said bearing layer and subsequently on said bearing layer thee said high refraction index layer is deposited characterized in that the at least one second diffractive pattern is formed in the said high refraction index layer, comprising at least one layer of chalcogenide based substances of different composition, which can be deposited subsequently or simultaneously.

5. The diffractive elements according to claim 4, characterized in that the high refractive index layer is deposited on said bearing layer, wherein said bearing layer is coloured in advance.

6. The diffractive elements according to claim 4, characterized in that the high refraction index layer is deposited under low pressure.

7. The diffractive elements according to claim 4, characterized in that the high refraction index layer is deposited on the bearing layer under atmospheric pressure.

8. The diffractive elements according to claim 1, characterized in that the said high refraction index layer is first deposited on the transparent bearing layer and only after that the first diffractive pattern is mechanically shaped in said high refraction index layer and/or both said layers and after that the at least one second diffractive pattern is formed in the said exposure-sensitive high refraction index layer.

9. The diffractive elements according to claim 1, characterized in that the at least one second diffractive pattern is formed in the high refraction index layer consisting of chalcogenide based substances by exposure and/or selective etching and/or photo- and/or thermally induced metal diffusion and/or with a halogen or oxygen implantation into the high refraction index layer by its interaction with halogen vapours or interaction with oxygen or through air hydrolysis.

10. The diffractive elements according to claim 1, characterized in that the chalcogenide based substances further comprise at least one element from the rare earth element group.

* * * * *

UNITED STATES PATENT AND TRADEMARK OFFICE
CERTIFICATE OF CORRECTION

PATENT NO.    : 6,452,698 B1
DATED         : September 17, 2002
INVENTOR(S)   : Vlcek et al.

It is certified that error appears in the above-identified patent and that said Letters Patent is hereby corrected as shown below:

Column 1,
Line 57, now reads "prepared from them determines their own reflectance (R"
should read -- prepared from them determines their low reflectance (R" --

Column 2,
Line 31, now reads "used as such layer 2 deposited on the transparent 1 in which"
should read -- used as such layer 2 deposited in the transparent layer 1 in which" --
Line 36, now reads "layer is either sigificantly lower (e.g. Ag n=0.8; Cu=0.7) or"
should read -- layer is either significantly lower (e.g. Ag n=0.8; Cu n=0.7) or --

Column 3,
Line 5, now reads "calcium as well as compounds Sb2 S3 and PbTe (U.S. Pat."
should read -- cadmium as well as compounds Sb2 S3 and PbTe (U.S. Pat. --
Line 9, now reads "5,300,784) can be used as holographic effect enhancing."
should read -- 5,300,764) can be used as holographic effect enhancing. --

Column 4,
Line 61, now reads "ously coloured layer 1 and thus through the combustion of"
should read -- ously coloured layer 1 and thus through the combination of --

Column 7,
Line 23, "layers number 1 to 2 and 5 (n1, n2 n5) and the photoinduced"
should read -- layers number 1 and 2 and 5 (n1, n2 n5) and the photoinduced --

Column 8,
Line 61, now reads "of I2). Even without subsequent exposure chalcogenide"
should read -- of I2). Even without subsequent exposure chalcohalide --

Column 10,
Line 2, now reads "in layer 1. Obtained hologram was set on document with test"
should read -- in layer 1. Obtained hologram was set on document with text --
Line 21, now reads "(including processing and an example of one possible mul-"
should read -- (including processing) and an example of one possible mul- --
Line 35, now reads "high refractive index layer 2 or to the bearing layer 1, 10"
should read -- high refraction index layer 2 or to the bearing layer 1, 10 --
Line 39, now reads "INDUSTRIAL APPLICATION"
should read -- INDUSTRIAL EXPLOITATION --
Line 40, now reads "the present invention is applicable for fabrication of"
should read -- The present invention is applicable for fabrication of --

UNITED STATES PATENT AND TRADEMARK OFFICE
CERTIFICATE OF CORRECTION

PATENT NO. : 6,452,698 B1
DATED : September 17, 2002
INVENTOR(S) : Vlcek et al.

It is certified that error appears in the above-identified patent and that said Letters Patent is hereby corrected as shown below:

Column 11,
Line 2, now reads "and subsequently on said bearing layer thee said high"
should read -- and subsequently on said bearing layer the said high --
Line 19, now reads "terized in that the high refractive index layer is deposited on"
should read -- terized in that the high refraction index layer is deposited on --

Signed and Sealed this

Eleventh Day of March, 2003

JAMES E. ROGAN
*Director of the United States Patent and Trademark Office*